United States Patent [19]
Burcham et al.

[11] Patent Number: 5,471,738
[45] Date of Patent: Dec. 5, 1995

[54] ROBOTIC SYSTEM FOR INSERTING CYLINDER LINERS INTO INTERNAL COMBUSTION ENGINE CYLINDER BLOCKS

[75] Inventors: Jimmy R. Burcham, Washington; John C. Handelman, Canton; Thomas E. Pearson, Grosse Ile, all of Mich.

[73] Assignee: Ford Motor Company, Dearborn, Mich.

[21] Appl. No.: 131,068

[22] Filed: Oct. 4, 1993

[51] Int. Cl.[6] .................................................. B23P 21/00
[52] U.S. Cl. ........................... 29/701; 29/771; 294/87.1; 294/94; 414/736; 901/39
[58] Field of Search ............................. 29/701, 771, 784, 29/786, 800, 822, 888.01, 888.06, 888.061; 294/87.1, 94; 414/225, 729, 736; 901/7, 39, 45

[56] References Cited

U.S. PATENT DOCUMENTS

| | | | |
|---|---|---|---|
| 1,822,432 | 9/1931 | Bradley | 294/87.1 |
| 2,387,971 | 10/1945 | Aspin et al. | 29/888.061 |
| 4,630,344 | 12/1986 | Boyle et al. | 901/39 |
| 4,799,853 | 1/1989 | Wrobbel et al. | 901/39 |
| 4,887,341 | 12/1989 | Sakimori et al. | 29/822 |
| 5,366,340 | 11/1994 | Vo et al. | 294/94 |

OTHER PUBLICATIONS

"Astek Accommodator RCC", Sensoflex/Astek End of Arm Products Product Digest, Aug. 1989.
"(RCC) Compliance Wrist", Robohand, Inc. Automation Accessories, Jan. 1992.
"Compensator", Assurance Technologies, Inc., Oct. 1991.
"Clamp Docking End Effector", Grasp, Inc. Automation.
"Flexible End–Of–Arm Tooling for Fixtureless Manufacturing", Robotics Today, vol. 5, No. 2, Second Quarter 1992.
"Compliant Robot Wrist", Nasa Tech Briefs, Oct. 1992, vol. 16, No. 10.
"Compliant Robotic Assembly Boosts Speed and Flexibility", Robotics World, Jan./Feb. 1989.
P. 42, Robotics World Jun. 1992.
"Compliance", International Encyclopedia of Robotics: Applications and Automation, vol. 1.
"Compliance", Robotics Applications for Industry, A Practical Guide, Noyes Data Corp. 1983.

*Primary Examiner*—David P. Bryant
*Attorney, Agent, or Firm*—Jerome R. Drouillard; Roger L. May

[57] ABSTRACT

A robotic system for inserting cylinder liners into the cylinder block from an internal combustion engine includes an articulated robot arm for cycling an end effector between a dunnage unloading position and a cylinder insertion position. The end effector, which is attached to the robot arm, picks liners from dunnage and places the liners in the cylinder bores of the cylinder block. The end effector includes remotely deployable combination teeth for gripping the liners to permit removal from their dunnage and for aligning the end effector and liner into the cylinder bores to permit insertion of the liners.

5 Claims, 4 Drawing Sheets

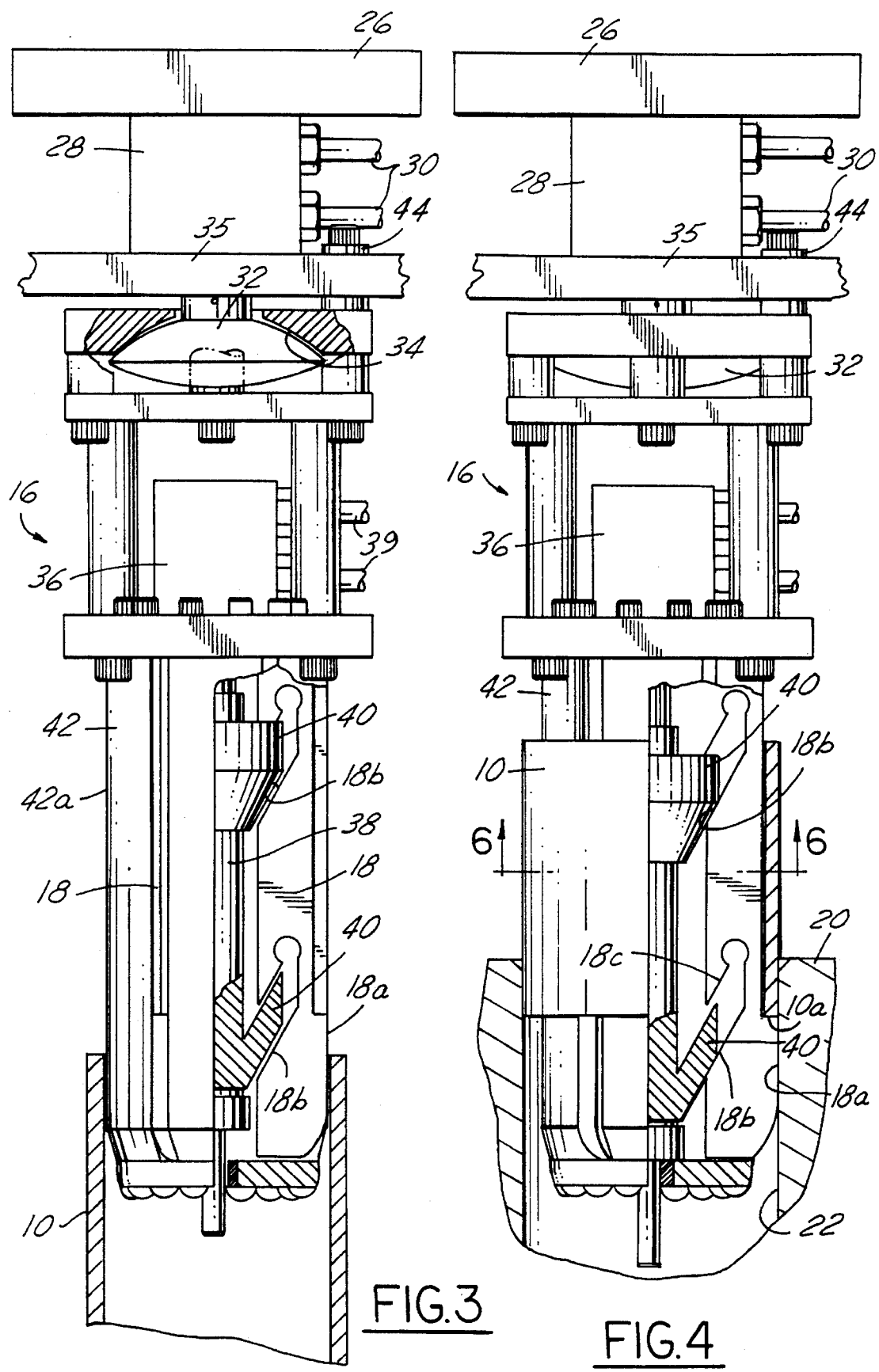

ROBOTIC SYSTEM FOR INSERTING CYLINDER LINERS INTO INTERNAL COMBUSTION ENGINE CYLINDER BLOCKS

BACKGROUND OF THE INVENTION

This invention relates to a mechanical system for inserting cylinder liners into the cylinder bores of an internal combustion cylinder block.

DESCRIPTION OF THE PRIOR ART

Although some automotive engines having aluminum cylinder blocks have been constructed without separate liners in the cylinder bores, it is customary to provide such liners, which are typically constructed of centrifugally cast iron. Liners may be pressed in place or, conventionally, the aluminum cylinder block is preheated and, taking advantage of aluminum's high coefficient of thermal expansion, an iron liner may be slipped into the heated block such that once the aluminum has cooled to the normal operating temperature of the block or below, the liner is gripped tightly by the aluminum surrounding the liner such that the liner cannot separate from the cylinder block. Unfortunately, the insertion of an iron liner into a heated aluminum cylinder block is frequently a difficult proposition for a human engine assembly operator. The liners must be inserted quickly and with one fluid motion, inasmuch as heat transfer from the parent bore to the liner will quickly cause the liner to expand and the aluminum to cool to the point where the liner cannot be inserted. This requires that the liner be positioned not only quickly, smoothly, and in a continuous motion, but also without cocking of the liner, which occurs when the centerline axis of the liner and the centerline axis of the bore into which it is being inserted are not collinear. If the liner becomes cocked in the cylinder bore, it will not slide completely into the bore because the liner will become jammed as the heat from the cylinder block flows into the liner, expanding the liner and causing a simultaneous contraction of the aluminum cylinder block. An additional drawback to the use of human production operators for inserting liners resides in the fact that the cylinder blocks must be heated to well above 100° centigrade and, as a result, the liner installation area is quite uncomfortable for a human operator.

A system according to the present invention avoids the shortcomings of manual insertion techniques by providing a precise liner picking and insertion system which assures that the liners will be properly engaged with the cylinder bores and smoothly inserted so as to prevent cocking and incomplete insertion of the liners.

SUMMARY OF THE INVENTION

A robotic system for inserting cylinder liners into the cylinder block of an internal combustion engine includes an articulated robot arm for cycling an end effector between a dunnage unloading position and a liner insertion position. An end effector is attached to the robot arm. The effector picks liners from dunnage and places the liners into the cylinder bores of the cylinder block. The end effector includes remotely deployable combination teeth for gripping the liners to permit removal from their dunnage and for aligning the end effector into the cylinder bores to permit insertion of the liners without cocking or jamming. The end effector is attached to the robot arm by means of a remotely controllable compliance device. The compliance device is maintained in a free position when the end effector is picking liners from dunnage, and as well as when the end effector is inserting the liners into the cylinder block. Conversely, the compliance device is in a locked, or noncompliant, position when the robot arm is translating the end effector from the dunnage to the cylinder block. As used herein, the term "dunnage" means a tray-like conveyance for transporting cylinder liners from a manufacturing or storage location to an engine assembly line. The compliance device for attaching the end effector to the robot arm preferably comprises an axially actuatable camming slide.

An end effector according to the present invention preferably comprises at least one generally cylindrical barrel having remotely deployable combination teeth extending radially outwardly from the cylindrical surface of the barrel. The combination teeth not only grip the inside diameter of the cylinder liners but also provide a means for aligning the end effector into the cylinder bores to permit insertion of the liners into the cylinder block.

According to yet another aspect of the present invention, a method for inserting cylinder liners into the cylinder block of an internal combustion engine comprises the steps of heating the cylinder block to expand the cylinder bore area sufficiently to permit installation of the liners, picking a plurality of cylinders from dunnage by means of a robotic device, and inserting the liners into the heated block with the robotic device. Preferably, all of the cylinders in one bank of the cylinder block will receive liners simultaneously.

BRIEF DESCRIPTION OF THE DRAWINGS

FIG. 3 illustrates an end effector according to the present invention as it grips a cylinder liner to remove the liner from dunnage.

FIG. 4 illustrates the end effector of FIG. 3 in the liner positioning mode.

DETAILED DESCRIPTION OF THE PREFERRED EMBODIMENTS

Figure 1:
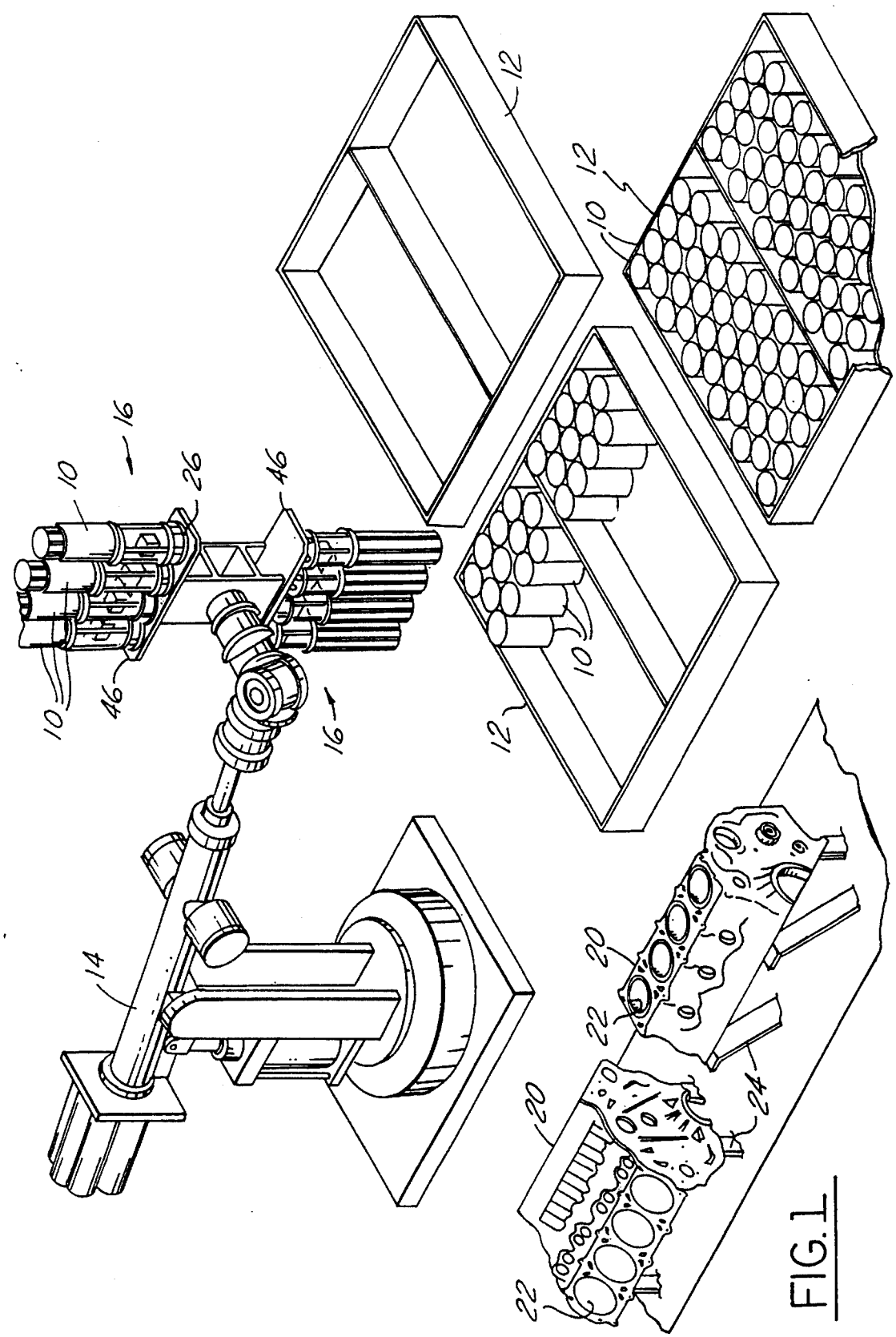
FIG. 1 illustrates a system according to the present invention in which a robot arm has positioned the end effector in the dunnage picking position.
Figure 2:
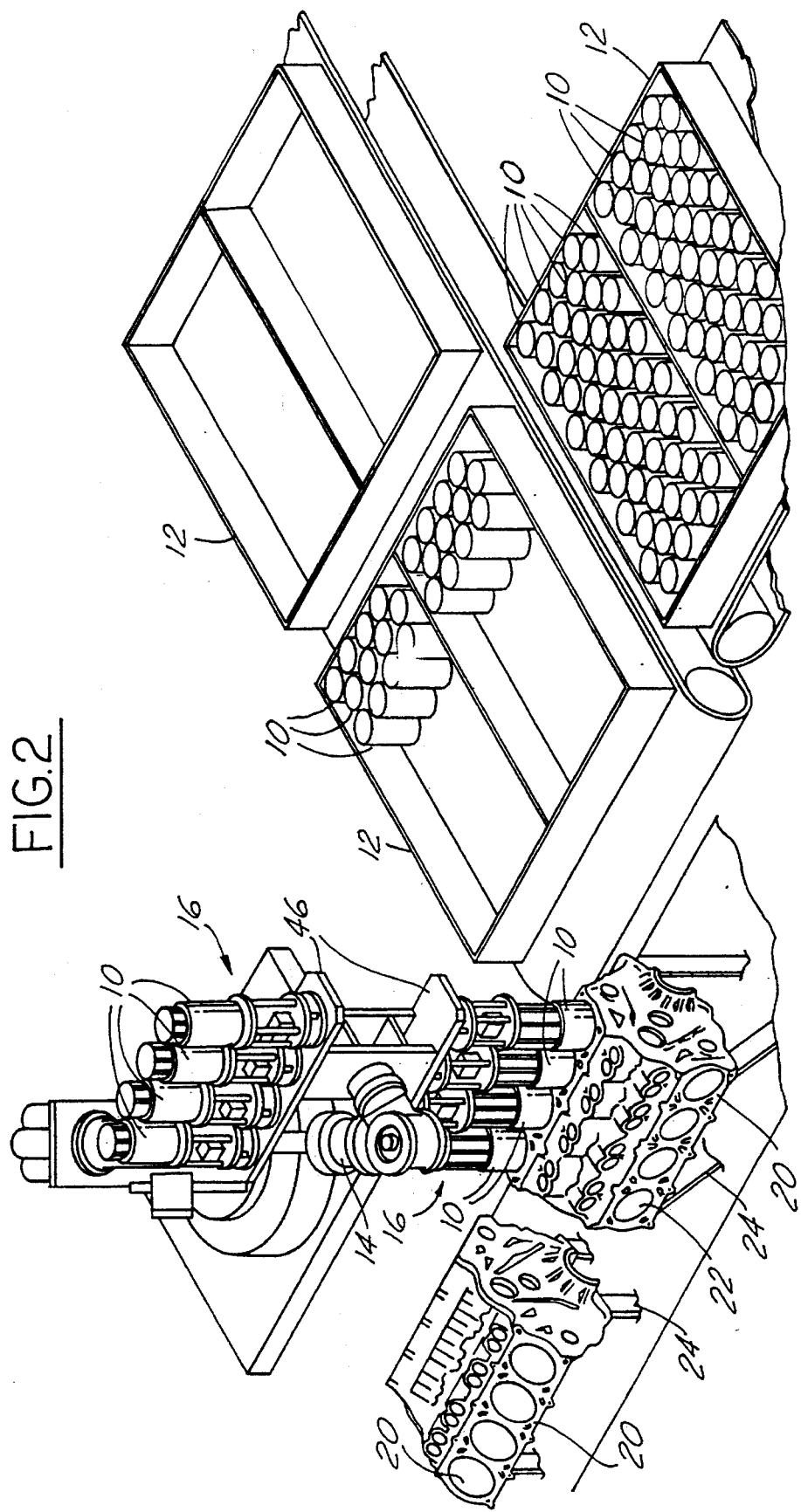
FIG. 2 is similar to FIG. 1 but illustrates the robot arm and end effector in the liner installation mode.
Figure 5:
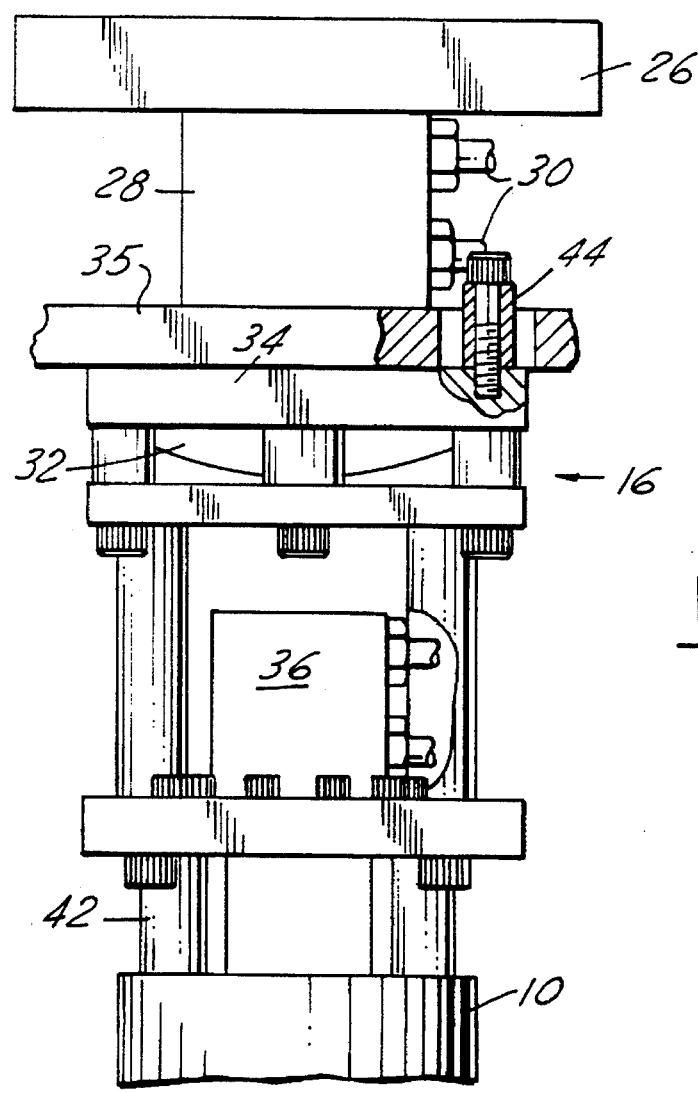
FIG. 5 illustrates a compliance device associated with the end effector in the locked mode, as when the compliance device is being translated from the dunnage picking to the cylinder installation mode by the robot arm.

As shown in FIGS. 1 and 2, a series of engine cylinder blocks 20 is progressing along an assembly line on fixtures 24. Articulated robot arm 14 has the task of cycling end effector 16 between a dunnage picking position in which cylinder liners 10 are removed from dunnage tray 12 and a liner insertion position in which the cylinder liners slide into the cylinder bores 22 of cylinder blocks 20. Preferably the outside surface of the each liner, as well as the surfaces of the parent bores, are machined and finished to provide approximately 0.0007 in. total diametral clearance with the cylinder block heated to 365° F. (with a 15° tolerance), and the liner at room temperature.

Cylinder blocks 20 are positioned by fixtures 24, which alternatively present the cylinder head mating surfaces of the banks of cylinders 22 in a horizontal orientation to robot arm 14 and end effector 16. As shown in FIG. 2, a first cylinder bank is in the vertical position for insertion of the liners 10 into cylinder bores 22. Following the insertion of liners into the first bank, end effector 16 will be rotated so that a second group of liners will be positioned for insertion into the block. At this time, the block will be rotated by fixture 24 about the block's longitudinal or crankshaft axis such that the second bank of cylinders is in a vertical position, with the cylinder head mating surface horizontal. As shown in FIG. 1, end effector 16 is rotatable on a vertical plane so as to allow the picking and insertion of eight cylinder liners from dunnage into the engine block.

Details of the operation of end effector 16 are shown in FIGS. 3–6. When end effector 16 and robot arm 14 are removing liners from dunnage, it is desirable to allow compliance between end effector 16 and robot arm 14. To this end, limited freedom of movement is provided between motor plate 35, which is rigid with end effector mounting flange 26, which is mounted upon base plate 46, and compliance motor 28 and socket 34 from which the balance of the end effector depends. As shown with particularity in FIGS. 3 and 5, socket plate 34 is engageable via compliance plunger 32, which is operated by compliance motor 28. Air introduced into lines 30 will cause a piston (not shown) within compliance motor 28 to pull compliance plunger 32 upwardly such that socket plate 34 is clamped tightly against motor plate 35. In this manner, end effector 16 is not allowed to swing freely from motor plate 35. When compliance motor 28 has positioned compliance plunger 32 in its lower, or unlocked position, pin 44, which extends from socket plate 34 through an aperture in motor plate 35, will allow a limited amount of compliance, while preventing rotation of socket plate 34 with respect to motor plate 35. Compliance plunger 32 is maintained in the locked position when robot arm 14 is moving end effector 16 from the dunnage picking position (FIG. 1) to the liner insertion position (FIG. 2). Robot arm 14, as well as compliance motor 28 and gripper motor 36 may be operated by a robot controller drawn from the class of appropriate controllers known to those skilled in the art and suggested by this disclosure.

Figure 6:
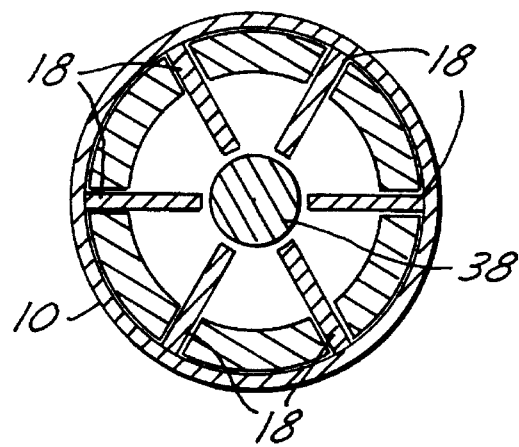
FIG. 6 is a sectional view of the end effector and liner of FIG. 4 taken along the direction of the lines 6—6 of FIG. 4.

The positions of combination teeth 18 within end effector 16 are shown for various conditions in FIGS. 3, 4, and 6. Beginning with FIG. 3, liner 10 is being engaged by end effector 16, which has a plurality of barrels 42, each having a plurality of combination teeth 18 extending radially outwardly from the cylindrical surface 42a of barrel 42. Combination teeth 18 have a larger diameter surface 18a, which is intended to contact not only the inner diameter of cylinder liners 10, but also the parent bore 22 of cylinder block 20. In the liner picking position shown in FIG. 3, surfaces 18a of combination teeth 18 are tightly clamped against the inside diameter of cylinder liner 10 by means of a plurality of plunger wedges 40 which are carried upon gripper plunger 38. Plunger 38 is controlled by gripper motor 36, which is supplied with air or other working fluid by means of lines 39. In effect, plunger 38 and wedges 40 comprise an axially actuatable camming slide. As shown in FIGS. 3 and 4, when plunger 38 is moved into a downward position away from gripper motor 36, combination teeth 18 will be caused to move radially outwardly because of the interaction of wedges 40 and cam surfaces 18b. As a result, combination teeth 18 will grip on the inside of cylinder liner 10, as shown in FIG. 3. As shown in FIG. 4, further downward movement of wedges 40 will relocate combination teeth 18 radially outward to the position wherein they can pilot upon the parent bore of the cylinder 22 while holding cylinder liners 10 by bearing upon end surface 10a of cylinder liner 10.

Cylinder liners 10 move upon end effector 16 from the position shown in FIG. 3 to the position shown in FIG. 4 when a bank of individual end effector units, having picked a set of liners from dunnage, is rotated from the liner picking position, as shown in FIG. 1, in a vertical plane to a setting position in which the liners which have been newly picked from the dunnage are inverted and allow the liner to fall under the force of gravity to the position shown in FIG. 4 when combination teeth 18 are moved to a retracted position by plunger wedges 40, gripper plunger 38, and gripper motor 36.

As shown in FIGS. 4 and 6, insertion of cylinder liners 10 into bores 22 is facilitated by combination teeth 18. Section 18a of each tooth pilots upon parent bore 22, as shown in FIG. 4. This will align both end effector 16 and liner 10 with parent bore 22. Before end effector 16 approaches cylinder block 20, compliance motor 28 will be place end effector 16 in the compliance mode by running compliance plunger 32 to the downward position. Liners 10 will drop into the cylinder bores, driven solely by the force of gravity, once combination teeth 18 are in the radially retracted position.

Those skilled in the art will appreciate in view of this disclosure that modifications may be made to the system according to the present invention while coming within the scope of the appended claims. For example, various motors could comprise pneumatic or hydraulic motors, as well as gear-driven motors, geared rack-type motors, and other devices known to those skilled in the art and suggested by this disclosure. Similarly, the choice of the number of plunger wedges employed and the precise design of the compliance devices and the control systems for the various motors and the robot arm may be selected by one skilled in the art, as prompted by this disclosure. Also, it has been determined that, depending upon the degree of automation desired, a robotic controller including appropriate sensing means may be employed to keep the liners in complete engine sets regardless of insertion failures, which may be caused by oversized liners, undersized parent bores, improper block preheating, or other causes. All such modifications come within the scope of the appended claims.

We claim:

1. A robotic system for inserting cylinder liners into the cylinder block of an internal combustion engine, comprising:

an articulated robot arm for cycling an end effector between a dunnage unloading position and a liner insertion position; and an end effector, attached to said robot arm, for picking liners from dunnage at the dunnage unloading position and for placing the liners into the cylinder bores of the cylinder block at the liner insertion position, with said end effector comprising remotely deployable combination teeth for gripping the interior of the liners to permit removal from their dunnage and for contacting the cylinder bores, so as to pilot the end effector and liners into the cylinder bores to permit insertion of the liners.

2. A robotic system according to claim 1, wherein said end effector is attached to said robot arm by a remotely controllable compliance device.

3. A robotic system according to claim 2, wherein said compliance device is in a free position when said end effector is picking liners from dunnage and when the end effector is inserting the liners into the cylinder block, with said compliance device being in a locked, noncompliant position when said robot arm is translating the end effector from the dunnage to the cylinder block.

4. A robotic system according to claim 1, wherein said end effector comprises at least one generally cylindrical body with said remotely deployable combination teeth extendable radially outwardly from the cylindrical surface of said body.

5. A robotic system according to claim 1, wherein said end effector comprises a generally cylindrical body for each of the cylinders of a single bank of said cylinder block such that a plurality of cylinder liners may be inserted into said cylinder block simultaneously.

* * * * *